United States Patent [19]

Kacirek et al.

[11] 4,108,319
[45] Aug. 22, 1978

[54] GLASS ACCUMULATOR

[75] Inventors: Kenneth J. Kacirek; Jack E. Rust, both of Fresno, Calif.

[73] Assignee: PPG Industries, Inc., Pittsburgh, Pa.

[21] Appl. No.: 770,553

[22] Filed: Feb. 22, 1977

[51] Int. Cl.² ............................................. B65G 57/30
[52] U.S. Cl. .................................. 214/6 BA; 198/625; 271/212
[58] Field of Search ...................... 214/6 BA; 271/212; 198/412, 422, 625, 663

[56] References Cited

U.S. PATENT DOCUMENTS

| | | | |
|---|---|---|---|
| 1,737,438 | 11/1929 | Stearns | 198/625 |
| 2,954,133 | 9/1960 | Geisow | 214/6 BA |
| 3,365,046 | 1/1968 | Morris et al. | 198/412 |
| 3,568,860 | 3/1971 | Rawlins | 214/6 BA |
| 3,712,487 | 1/1973 | Eberle | 214/6 BA |

FOREIGN PATENT DOCUMENTS 21,609  3/1947  Finland .................................. 271/212

Primary Examiner—Drayton E. Hoffman
Assistant Examiner—Ross Weaver
Attorney, Agent, or Firm—Donald Carl Lepiane

[57] ABSTRACT

A glass accumulator includes a first pair and a second pair of helically threaded rotating shafts angled away from each other. The first and second pair of shafts are rotated in opposite directions to vertically displace glass sheets from a horizontal conveyor and accumulate the glass sheets at the top of the shafts. Angling the pair of shafts away from each other minimizes contact between surfaces of the helical threads and the glass sheets.

13 Claims, 2 Drawing Figures

GLASS ACCUMULATOR

BACKGROUND OF THE INVENTION

1. Field of the Invention

This invention relates to a glass accumulator and more particularly to a glass accumulator having a first and second plurality of helically threaded shafts angled away from each other.

2. Discussion of the Prior Art

In the prior art there are taught accumulators having rotating threaded shafts.

U.S. Pat. Nos. 1,656,285; 1,663,288; 3,015,303; 3,063,577; 3,203,561; 3,280,679 and 3,712,487 each in general teach an accumulator including a pair of spaced shafts having spiral or screw surfaces. The shafts are rotated as sheet material, for example, paper sheets, can lids, or metal sheets are moved onto the screw surfaces. As the shafts rotate, the sheet material is advanced upward and moves into surface engagement with one another at the top of the threaded shafts.

Although each of the accumulators taught in the abovementioned patents are ideally suitable for their particular purposes, they are not suitable for accumulating glass sheets.

When using accumulators having threaded shafts for stacking glass sheets, the threaded surfaces are preferably coated with a resilient material or made of a non-abrasive material to prevent marring of the glass surfaces engaged by the threads. Further, if the longitudinal axis of the shafts are parallel to one another as taught in the prior art, the edges of the advancing glass sheets cut into the resilient material. When this occurs, the threads have to be recoated or replaced. Further, surface contact between the threads and the glass sheet should be at a minimum to prevent marring of the glass surface as the sheets are advanced by the rotating shafts.

It would be advantageous therefore to provide a glass accumulator that does not have the drawbacks of the prior art.

SUMMARY OF THE INVENTION

This invention relates to a sheet accumulator having facilities for sequentially engaging marginal edge portions of a sheet while maintaining the edge portions of the sheet spaced from the engaging facilities. Rotating facilities act on the engaging facilities to sequentially engage the marginal edge portions of the sheet.

This invention also relates to a method of accumulating sheets, e.g., glass sheets. The sheets are advanced along an article movement path lying in a first plane. The sheets are successively engaged at their marginal edges while suspending the peripheral edges of the sheets. The engaged sheets are successively advanced in a direction normal to the predetermined plane and stacked.

DESCRIPTION OF THE INVENTION

Figure 1:
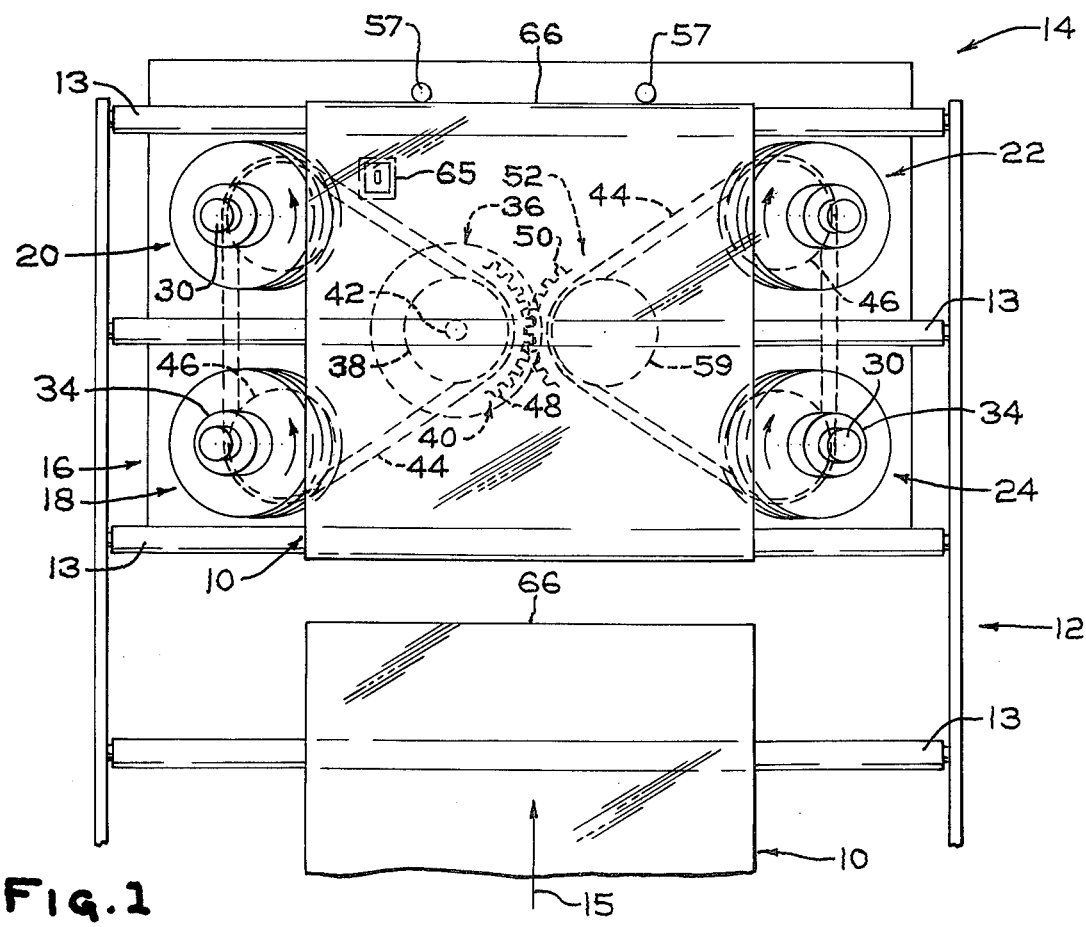
FIG. 1 is a plan view of a conveyor for moving sheets into accumulator incorporating features of the invention.

With reference to FIG. 1, a sheet 10 is advanced along conveyor 12 into accumulator 14 incorporating features of the invention. In the following discussion, like numerals refer to like elements.

In general, the conveyor 12 includes a plurality of spaced rolls 13 mounted and driven in any conventional manner to advance the sheet 12 along a horizontal path in the direction of the arrow 15. As will be appreciated, the invention is not limited to the type of conveyor 12 used to advance the sheets 10 into the accumulator 14 and any of the types known in the art may be used.

In the following discussion, the sheet 10 is a glass sheet; however, the invention is not limited thereto. For example, wooden sheets and metal sheets may be used in the practice of the invention.

Figure 2:
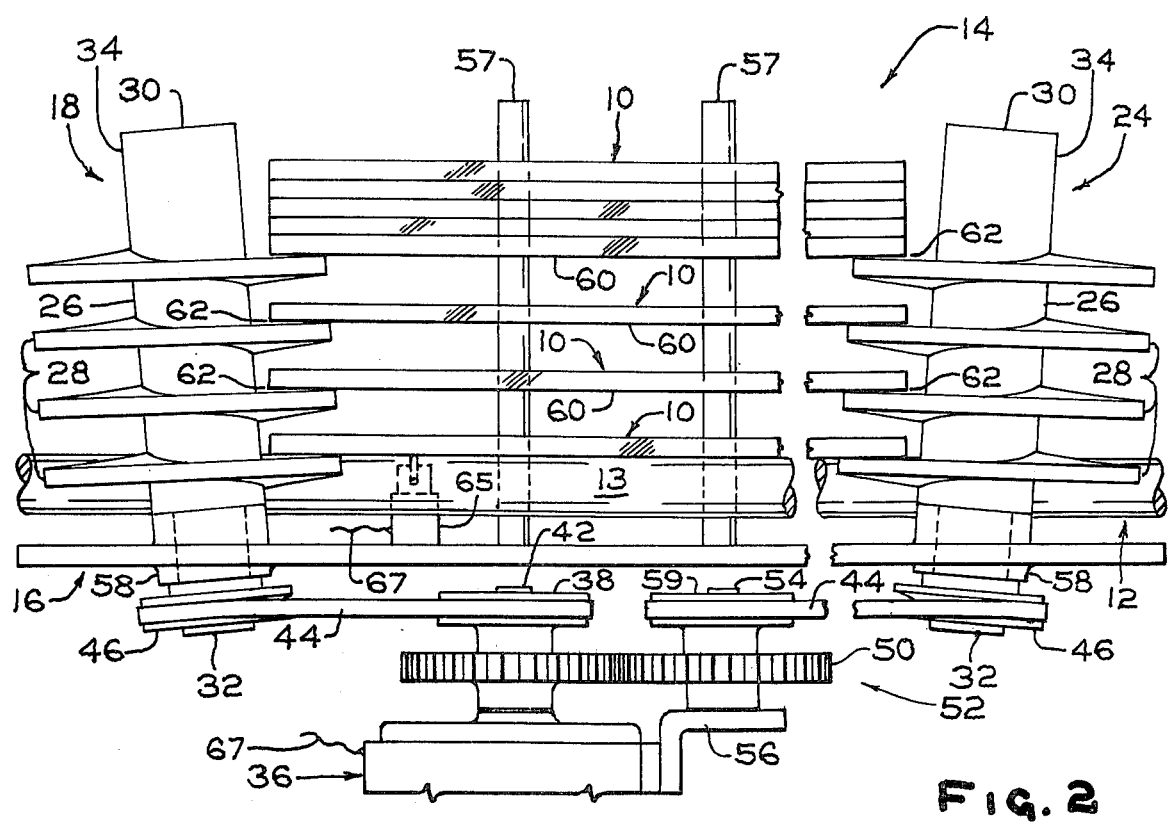
FIG. 2 is a fragmented frontal view of the accumulator of FIG. 1.

Referring now to FIGS. 1 and 2, the accumulator 14 includes a base 16 mounted below the conveyor 12 for rotatably supporting a plurality of shafts 18, 20, 22 and 24 extending between and beyond adjacent rolls 13 as shown in FIGS. 1 and 2. Each of the shafts 18, 20, 22 and 24 are similar in construction and include a central shaft portion 26 having helical threads 28 spaced from shaft ends 30 and 32. The shafts 18 and 20 have right hand threads 28 and the shafts 22 and 24 have left hand threads 28 to raise the sheets 10 upward as shown in FIG. 2 and in a manner to be discussed below. End shaft portion 34 between the shaft end 30 and adjacent helical threads 28 is the stacking section of the accumulator 14. In FIG. 2, there is shown a plurality of stacked sheets 10.

The shaft end 32 is rotatably mounted in the base 14 and operatively connected to motor 36 in any conventional manner to rotate the shafts 18 and 20 in a first direction and the shafts 22 and 24 in a second opposite direction. For example, but not limiting to the invention, a pulley 38 and gear wheel 40 are secured on motor shaft 42. A belt 44 has its course around the pulley 38 and pulley 46 mounted on the end 32 of the shafts 18 and 20.

Teeth 48 of the gear wheel 40 mesh with teeth 50 of gear wheel 52 rotatably mounted on shaft 54. The shaft 54 is rotatably mounted in plate 56 secured to the motor 36 in any conventional manner. Pulley 58 is mounted on the shaft 54 and is operatively connected to the pulleys 46 mounted on the ends 32 of the shafts 22 and 24 by belt 44. As the motor shaft 42 rotates in a first direction, the shafts 18 and 20 rotate in the first direction and the shafts 22 and 24 rotate in a second opposite direction. In this manner, the sheet 10 is simultaneously advanced forward in the direction of the arrow 15 into stop members 57 mounted on the base 16 and upward as viewed in FIG. 2.

Each of the shafts 18, 20, 22 and 24 are rotatably mounted in the base 16 by way of sleeve bearing 58 secured in the base 16 in any conventional manner. The axial center of the shafts 18 and 20 are generally parallel to one another and subtend an oblique angle to a line normal to the base 16. Similarly, the axial center of the shafts 22 and 24 are generally parallel to one another and subtend an oblique angle to a line normal to the base 16. With this arrangement, the shafts 18 and 20 are angled away from the shafts 22 and 24 as shown in FIGS. 1 and 2. Angling the shafts 18 and 20 away from the shafts 22 and 24 minimizes the contact area between bottom surface 60 of the glass sheets and the threads 28. In other words, the threads 28 of the shafts 18, 20, 22 and 24 support the sheet at the marginal edges with the peripheral corners 62 of the sheet suspended above the threads 28 of the shafts.

Reducing contact area between the threads 28 of the shafts 18, 20, 22 and 24 and the surface of the glass sheets minimize marring of the glass sheets as the sheets are displaced upward and stacked.

Although not limiting to the invention, the threaded shafts are preferably made of a non abrasive material, e.g., nylon or a resilient material, e.g., rubber or a composite of metal coated with a resilient material to prevent marring of the glass sheets. An additional advantage of angling the shafts 18, 20, 22 and 24 is that the peripheral edges 62 of the glass sheets 10 will not cut into the threads of the shafts 18, 20, 22 and 24.

Consider now the angle subtended by the axial center of the shafts 18, 20, 22 and 24 and a line normal to the base. As the angle increases, the contact area between the bottom surface 60 of the sheets 10 and the threads 28 decrease and vice versa.

As can now be appreciated, the invention is not limited to the spacing between the shafts 18, 20, 22 and 24, the spacing between the threads 28 or the depth of the threads.

In practice a glass sheet is advanced along the movement path by the conveyor 12 between threads of the shafts of the accumulator 14 as shown in FIG. 2. The leading edge 66 engages switch 65 mounted downstream of the shafts 20 and 22. The switch energizes the motor 36 by way of wire 67 to rotate the shafts one complete revolution. The sheet 10 is advanced forward to move the leading edge of the sheet into engagement with the stop members 57 and then upward as viewed in FIG. 2. As the sheet moves upward, it disengages the switch 65 to deenergize the motor 36.

The next successive sheets are advanced upward in a similar manner. The sheets are continually advanced upward and stacked in the stacking section of the accumulator to form a glass stack.

Although the invention was discussed using 4 shafts 18, 20, 22 and 24, the invention is not limited thereto. Any number of shafts may be used in the practice of the invention.

DETAILED DESCRIPTION OF THE INVENTION

The accumulator 14 of the instant invention is used to stack glass sheets 10 having a length of about 7 inches (17.8 centimeters) as measured between the leading edge 66 and trailing edge; a width of about 4 inches (10.2 centimeters) and a thickness of about ⅛ inch (0.32 centimeter). The accumulator 14 includes four nylon threaded shafts 18, 20, 22 and 24 each identical in construction. Each of the threaded shafts has a length of about 3 inches (7.6 centimeters) and a diameter of about 3.5 inches (8 centimeters). The distance between shaft end 30 and adjacent helical threads 28 is about 1 inch (2.54 centimeters) to provide a glass stacking section. The distance between shaft end 32 and adjacent helical threads is about 3 inches (7.6 centimeters).

The helical threads 28 have a pitch of 10° and a groove width of about 5/16 inch (0.8 centimeter). The threads 28 of shafts 18 and 20 are right hand threads and the threads 28 of the shafts 22 and 24 are left hand threads.

The shafts 18, 20, 22 and 24 are rotatably mounted in a metal base 16 by sleeve bearings 58 in any conventional manner. The shafts 18 and 20 are mounted on the base such that the axial centers of the shafts 18 and 20 are parallel to one another and subtend an angle of about 6° with a line normal to the base 16. The shafts 22 and 24 are mounted in a similar manner such that the shafts 18 and 20 are angled away from the shafts 22 and 24. The shafts 18 and 24 are on a center-to-center spacing of about 5 inches (12.7 centimeters) and the shafts 18 and 20 are on a center-to-center spacing of about 3 inches (7.6 centimeters) as measured between the shaft ends 30.

A pulley 46 is mounted on the end 32 of each threaded shaft with the pulley 46 of the shafts 18 and 20 connected to pulley 38 mounted on motor shaft 42 by way of belt 44. The pulley 46 on the shafts 22 and 24 are connected to pulley 58 mounted on shaft 54 by belt 44.

The pulley 58 is powered by motor 36 through gears 40 and 52. The shafts 18, 20, 22 and 24 are rotated at a speed of about 60 revolutions per minute with the shafts 18 and 20 rotating in a counterclockwise direction and the shafts 22 and 24 rotating in a clockwise direction as viewed in FIG. 1.

The glass sheets 10 are individually advanced from a tempering furnace (not shown) toward the accumulator 14 by conveyor 12 at a speed of about 600 inches per minute (15 meters per minute). As the first glass sheet advances along the conveyor, interleaver material may be applied to a surface in any conventional manner.

Leading edge 66 of the first sheet 10 is moved between the threads 28 of the shafts toward stop members 57 into engagement with switch 65 by the conveyor 12. The switch 65 energizes the motor 36 to rotate the threaded shafts one complete revolution to raise the sheet above the conveyor 12 and out of engagement with the switch 65 to deenergize the motor 36. As the first sheet is advanced upward, a second sheet is acted on in a similar manner as the first sheet.

The sheets are incrementally moved upward by the threads and stacked as shown in FIG. 2. Forward motion of the sheet 10 as viewed in FIG. 1 is prevented by the stop members 57.

As can be appreciated, the above example is merely illustrative of one embodiment of the invention and the invention is not limited thereto.

What is claimed is:
1. Sheet accumulator, comprising:
   means for advancing a sheet to be stacked along a predetermined path;
   means for engaging marginal edge portions of the sheet at a distance spaced from adjacent peripheral edge portions of the sheet and for maintaining the sheet portions between the engaged marginal edge portions and adjacent peripheral edge portions free of surface contact; and
   means for moving said engaging means to displace the sheet by said engaging means relative to the predetermined path while continually maintaining portions between the engaged marginal edge portions and adjacent peripheral edge portions of the sheet free of surface contact during sheet displacement.

2. Sheet accumulator, comprising:
   a first, second, third and fourth threaded shaft each having an axial center;
   a base;
   means for rotatably mounting said shafts on said base such that the axial center of said first and second shafts are generally parallel to one another and subtend an oblique angle with a line normal to said base and the axial center of said third and fourth shafts are generally parallel to one another and subtend an oblique angle with a line normal to the base to sequentially engage marginal edge portions of the sheet while spaced from adjacent peripheral edge portions of the sheet; and means acting on said shafts for rotating said shafts to sequentially engage marginal edge portions of the sheet.

3. The accumulator as set forth in claim 2 wherein the sheet are glass sheet.

4. The accumulator as set forth in claim 3 wherein the shafts are made of a material that prevents marring of the glass sheet.

5. The accumulator as set forth in claim 2 wherein each of said shafts include a sheet accumulating portion adjacent one end and a threaded portion for advancing the sheet toward said sheet accumulating portion.

6. The accumulator as set forth in claim 5 further including:
a roll conveyor mounted over said base and having said shafts extending through and above said conveyor to move the sheet between the shafts along a predetermined path;
means mounted in the path and connected to said rotating means for energizing said rotating means; and
stop member mounted downstream of said shafts to prevent movement of the sheet along the path.

7. The accumulator as set forth in claim 2 wherein said rotating means includes motor means for rotating said first and second shafts in a first direction and said third and fourth shafts in a second opposite direction.

8. A method of accumulating sheets, comprising:
advancing sheet along an article movement path into a predetermined position;
engaging the sheet in the predetermined position at positions on the marginal edge portions of the sheet spaced from adjacent peripheral edge portions while the surface portions of the sheet between the engaged portions and adjacent peripheral edge portions are free of surface contact to displace the sheet away from the predetermined position;
continuously engaging the sheet at positions on the marginal edge portions while maintaining the surface portions of the sheet between the engaged portions and adjacent peripheral edge portions free of surface contact as the sheet is moved into a stacking position; and
repeating the above steps for each sheet in the predetermined positions.

9. The method as set forth in claim 8 wherein the sheets are glass sheets.

10. The method as set forth in claim 8 wherein the sheets are tempered flat glass sheets.

11. The sheet accumulator as set forth in claim 1 wherein said engaging means includes:
at least two threaded shafts each having an axial center; and
means for mounting said threaded shafts in spaced relation to one another such that the axial centers of the shafts subtend an oblique angle with one another.

12. The sheet accumulator as set forth in claim 11 wherein the sheet is a glass sheet.

13. The method as set forth in claim 8 wherein the predetermined position lies in a generally horizontal plane and said engaging steps advance the sheet in a direction generally normal to the horizontal plane.

* * * * *